(12) United States Patent
Birthisel et al.

(10) Patent No.: US 9,115,307 B2
(45) Date of Patent: Aug. 25, 2015

(54) SOIL ADHERENT PELLET AND ACTIVE AGENT DELIVERY WITH SAME

(71) Applicants: Timothy D. Birthisel, Perrysburg, OH (US); Joseph Schalk, Maumee, OH (US); Joseph Schanski, Maumee, OH (US)

(72) Inventors: Timothy D. Birthisel, Perrysburg, OH (US); Joseph Schalk, Maumee, OH (US); Joseph Schanski, Maumee, OH (US)

(73) Assignee: The Andersons, Inc., Maurnee, OH (US)

( * ) Notice: Subject to any disclaimer, the term of this patent is extended or adjusted under 35 U.S.C. 154(b) by 100 days.

(21) Appl. No.: 13/854,447

(22) Filed: Apr. 1, 2013

(65) Prior Publication Data

US 2013/0259582 A1    Oct. 3, 2013

Related U.S. Application Data

(60) Provisional application No. 61/618,783, filed on Mar. 31, 2012.

(51) Int. Cl.

| | |
|---|---|
| A01N 25/34 | (2006.01) |
| A61K 33/42 | (2006.01) |
| A01N 59/08 | (2006.01) |
| A61K 33/14 | (2006.01) |
| A61K 33/06 | (2006.01) |
| A01N 59/02 | (2006.01) |
| A01N 59/06 | (2006.01) |
| C09K 17/42 | (2006.01) |
| C09K 17/04 | (2006.01) |
| C05D 3/02 | (2006.01) |
| C05G 3/00 | (2006.01) |
| C05G 3/02 | (2006.01) |
| C05G 3/04 | (2006.01) |

(52) U.S. Cl.
CPC . *C09K 17/42* (2013.01); *C05D 3/02* (2013.01); *C05G 3/0047* (2013.01); *C05G 3/02* (2013.01); *C05G 3/04* (2013.01); *C09K 17/04* (2013.01)

(58) Field of Classification Search
None
See application file for complete search history.

(56) References Cited

U.S. PATENT DOCUMENTS

| | | | |
|---|---|---|---|
| 5,698,001 A | 12/1997 | Keenportz | |
| 6,936,681 B1 | 8/2005 | Wertz et al. | |
| 7,730,662 B2 | 6/2010 | Krysiak et al. | |
| 7,731,775 B2 | 6/2010 | Palmer et al. | |
| 8,105,646 B2 | 1/2012 | Dody et al. | |
| 8,316,580 B2 | 11/2012 | Krysiak et al. | |
| 2001/0029762 A1* | 10/2001 | Steele et al. | 71/63 |
| 2002/0174697 A1 | 11/2002 | Reid et al. | |
| 2004/0069032 A1 | 4/2004 | Krysiak et al. | |
| 2006/0084573 A1 | 4/2006 | Grech et al. | |
| 2006/0148646 A1 | 7/2006 | Pursell et al. | |
| 2006/0230798 A1* | 10/2006 | McConchie et al. | 71/33 |
| 2007/0280981 A1 | 12/2007 | Birthisel | |
| 2010/0216639 A1 | 8/2010 | Hubbs | |
| 2010/0326151 A1* | 12/2010 | Madigan et al. | 71/8 |
| 2011/0283759 A1 | 11/2011 | Cisneros et al. | |

FOREIGN PATENT DOCUMENTS

| | | | |
|---|---|---|---|
| FR | 2405910 | * | 6/1979 |
| WO | WO 03043755 | * | 5/2003 |

OTHER PUBLICATIONS

Handout from Weed Science Society Association meeting, Jan. 18, 2012.

* cited by examiner

*Primary Examiner* — Alton Pryor
(74) *Attorney, Agent, or Firm* — Avery N. Goldstein, Esq.; Blue Filament Law, PLLC

(57) ABSTRACT

A soil adherent pellet is detailed that includes a soluble calcium ion source, a magnesium ion source, or both present in an amount ranging from 15% to 99.9% by weight of a total dry weight of the pellet and a binder present in an amount ranging from 85% to 0.1% by weight of the total dry weight of the pellet. The pellet having a mean pellet domain size and a pellet surface. The soil adherent pellet is well suited for flocculating clay within the soil and delivery of an active ingredient with reduced runoff compared to prior art broadcast particles. A soil adherent pellet is also provided having a soluble calcium and/or magnesium ion source that is polycrystalline and carries therewith an active ingredient.

9 Claims, 1 Drawing Sheet

SOIL ADHERENT PELLET AND ACTIVE AGENT DELIVERY WITH SAME

RELATED APPLICATIONS

This application claims priority benefit of U.S. Provisional Application Ser. No. 61/618,783 filed Mar. 31, 2012; the contents of which are hereby incorporated by reference.

FIELD OF THE INVENTION

The present invention in general relates to a soil adherent pellet and in particular to a pellet that upon contact with clay deforms and adheres thereto with the delivery of associated ingredients to the soil with reduced active ingredient runoff.

BACKGROUND OF THE INVENTION

Runoff represents the water flow that occurs when soil is saturated and excess water flows across a soil surface. While runoff is problematic owing to erosive loss of topsoil, the deleterious effects are compounded when fertilizer or active ingredients are transported along with runoff. Representative of these complications is damage to downstream waterways that include eutrophication, anaerobic dead zones, and bioaccumulation of active ingredients such as herbicides and insecticides.

As various soil types have widely varying capacity to hold water, the amount of runoff in general tends to vary proportionally with the water holding capacity of a given soil. As clay containing soil tends to be slow to absorb water, clay soils are particularly prone to runoff problems and the conveyance of human applied material into downstream bodies of water. Clay subsoil layers have slow water infiltration rates and as such show exceptionally high degrees of runoff in response to a heavy rain.

In response to problems associated with a spray application drift, there is an accelerating trend toward delivery of agents such as plant nutrients, fertilizers, pesticides to target cultivated vegetation through resort to broadcast application of pelletized products containing a given active ingredient. Representative of such methods of broadcast application is the use of a rotary spreader. Such pellets are well suited for application to agricultural fields, golf courses, parks, lawns, gardens, and woodlands. Such granular products typically have a size in the range of 0.5 mm to about 10 mm and can be based on various inert substances such as limestone, cellulosic particulates such as sawdust, corncob, stover, and wheat chaff. Representative of such materials are DG® and DG Lite® produced by The Andersons and based on dolomite or dolomite inclusive of wood flour with a binder holding together the constituent granules into agglomerated pellets, respectively. Unfortunately, when conventional pellets are applied to clay rich soils, the pellets upon wetting merely rest on the soil surface and the components of the pellets including active ingredients present in the delivered pellet exhibit a high degree of runoff causing downstream pollution and ineffective vegetation treatment.

Efforts to bind dispersed particles to soil have met with limited success and relied on synthetic polymers/ Exemplary of these efforts is U.S. Pat. No. 8,316,580 in which polyacrylamide particles are used to bind to soil. Unfortunately, acrylamide monomer present either through incomplete polymerization or polymer degradation is known to be a potent neurotoxin.

Thus, there exists a need for a soil adherent pellet and the ability to deliver active ingredients to such soil with such a pellet. There further exists a need to limit the amount of applied active agent runoff associated with pellet distribution to an area to limit runoff associated downstream conveyance of applied active agents.

SUMMARY OF THE INVENTION

A soil adherent pellet is detailed that includes a soluble calcium and/or magnesium ion source present in an amount ranging from 15% to 99.9% by weight of a total dry weight of the pellet and a binder present in an amount ranging from 85% to 0.1% by weight of the total dry weight of the pellet. The pellet having a mean pellet domain size and a pellet surface. The soil adherent pellet is well suited for flocculating clay within the soil and delivery of an active ingredient with reduced runoff compared to prior art broadcast pellets. A soil adherent pellet is also provided having a soluble calcium and/or magnesium ion source that is polycrystalline and carries therewith an active ingredient.

DETAILED DESCRIPTION OF THE PREFERRED EMBODIMENTS

Figure 1:
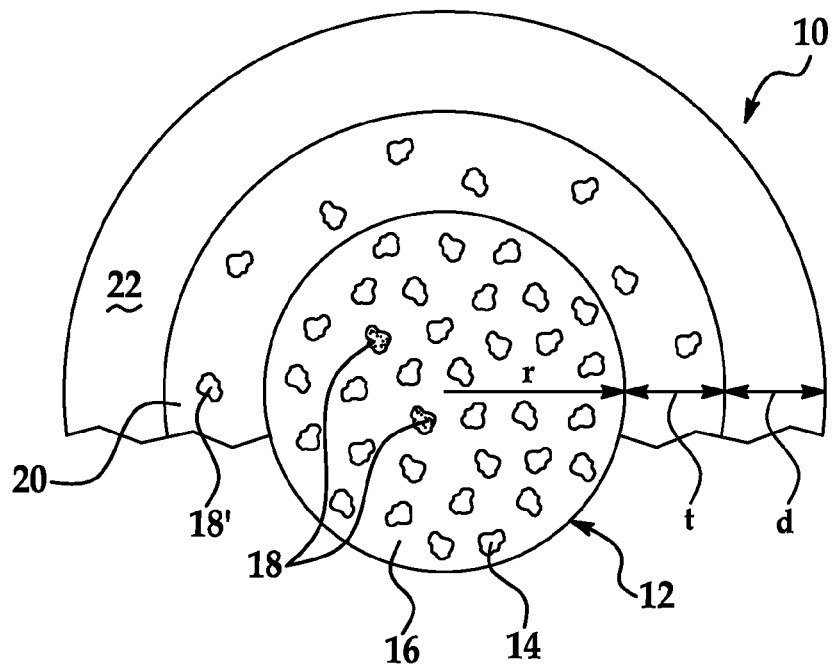
FIG. 1 is a cross sectional view of an inventive pellet in composite with a soluble calcium and/or magnesium ion source granule core, of radius r, and a binder intermixed with granules and an optional active ingredient depicted in the core, and a surface coating, an optional adhesive layer is also depicted.

The present invention has utility as a dispersible pellet to improve water penetration in clay containing soils. The present invention also has utility in delivering active ingredients associated with such pellets to a soil with a reduced active ingredient runoff compared to conventional applications. An inventive soil adherent pellet includes a soluble calcium and/or magnesium ion source in an amount sufficient to chemically react with a clay component of soil so as to induce pellet adherence to the soil upon wetting. An inventive pellet is formulated in some embodiments with a binder adhering together granules of soluble calcium and/or magnesium ion source to define the inventive pellet as a way to improve soil drainage. In other embodiments, an active ingredient is added thereto either dispersed throughout the pellet or as a surface coating thereon. In still other embodiments, the soluble calcium and/or magnesium ion source is formed as a polycrystalline pellet core with an active ingredient intermixed throughout the polycrystalline core or as a surface coating thereon. In still other embodiments, an active ingredient forms a core and has the soluble calcium and/or magnesium ion source as a surface coating thereon.

As used herein "soluble calcium and/or magnesium ion source" is a salt or salt hydrate containing calcium and/or magnesium divalent ions having a solubility and deionized water of at least 0.6 grams per liter at 25° C.

It is to be understood that in instances where a range of values are provided that the range is intended to encompass not only the end point values of the range but also intermediate values of the range as explicitly being included within the range and varying by the last significant figure of the range.

By way of example, a recited range of from 1 to 4 is intended to include 1-2, 1-3, 2-4, 3-4, and 1-4.

Without intending to be bound to a particular theory, it is surmised that the soluble calcium and/or magnesium ion source component of an inventive pellet in contact with soil containing clay, once wetted solubilizes calcium and/or magnesium ions that displace sodium ions on the clay surface through a cationic exchange thereby inducing soil clays to flocculate into larger aggregates so as to increase soil porosity. By chemically reacting with the soil clays to flocculate soil clay pores are created around the inventive pellet that places the components of an inventive pellet into the soil, as opposed to resting thereon and thereby inhibiting runoff. Through resort to an inventive pellet of a sufficiently small size and high enough calcium ion concentration, the soil porosity is increased at a kinetically sufficient rate to promote water penetration through the soil, as opposed to surface runoff. In still other embodiments, soluble magnesium ions in an inventive pellet react with clay to enhance soil porosity and thereby inhibit runoff of pellet components. It is appreciated that limiting, in particular phosphorus runoff is critical to preventing algal blooms and eutrophication of downstream water resources. As a result of inventive pellet action, active ingredients associated with an inventive pellet to the soil with far less active ingredient runoff than that associated with a conventional delivery pellet.

Soluble calcium and/or magnesium ion source according to the present invention illustratively includes calcium and/or magnesium sulfate, calcium and/or magnesium chloride, calcium and/or magnesium citrate, calcium and/or magnesium nitrate, calcium and/or magnesium phosphate; hydrates of any of the aforementioned; mixed salts of any of the aforementioned; and minerals rich in any of the aforementioned salts, most notably of which being gypsum. Mineral and organic acids may also assist in the process of forming calcium and/or magnesium ions by liberating them from the insoluble forms that exist at higher pH. The calcium and/or magnesium ion source is present in amounts ranging from 15 to 99.9 percent by weight of the total dry weight of an inventive pellet. Preferably the calcium and/or magnesium ion source is present in amounts ranging from 30% to 99.5% by weight of the total dry weight of the pellet.

The pellets of the present invention have a mean pellet domain size that ranges from 0.1 mm to 30 mm. In specific embodiments, the mean pellet domain size ranges from 0.25 mm to 20 mm while in still other embodiments the mean pellet domain size ranges from 0.5 mm to 15 mm. An inventive soil adherent pellet is either formed by crystallizing a soluble calcium and/or magnesium ion source from a solution in the size of an inventive pellet core with the active ingredient in the soluble calcium and/or magnesium ion source solution or added subsequent to pellet formation; or in other embodiments, the soluble calcium and/or magnesium ion source is formed into fine granules where the granules are sized such that greater than 90 weight percent of the granules are between +400 and −40 standard mesh size (US Sieve). The granules of soluble calcium and/or magnesium ion source being held together by a binder. The binder being present in amounts ranging from 85% to 0.1% by weight of the total dry weight of the pellet. In specific embodiments containing granular soluble calcium and/or magnesium ion sources, the binder component is present in amounts ranging from 1% to 50% by weight of the total dry weight of the pellet; with the remainder of the pellet weight to yield 100% being composed of various additives illustratively including active ingredients, fillers, desiccants, colorants, fragrances, and the like, and combinations thereof.

Illustrative examples of binders operative herein are carbohydrates such as monosaccharides, disaccharides, oligosaccharides and polysaccharides; proteins; lipids; glycolipid; glycoprotein; lipoprotein; and combinations and derivatives of these. Specific carbohydrate binders illustratively include glucose, mannose, fructose, galactose, sucrose, lactose, maltose, xylose, arabinose, trehalose and mixtures thereof such as corn syrup; celluloses such as carboxymethylcellulose, ethylcellulose, hydroxyethylcellulose, hydroxymethylethylcellulose, hydroxyethylpropylcellulose, methylhydroxyethyl-cellulose, methylcellulose; starches such as amylose, seagel, starch acetates, starch hydroxyethyl ethers, ionic starches, long-chain alkyl starches, dextrins, amine starches, phosphates starches, and dialdehyde starches; plant starches such as corn starch and potato starch; other carbohydrates such as pectin, amylopectin, xylan, glycogen, agar, alginic acid, phycocolloids, chitin, gum arabic, guar gum, gum karaya, gum tragacanth and locust bean gum; complex organic substances such as lignin and nitrolignin; derivatives of lignin such as lignosulfonate salts illustratively including ammonium-, calcium- and/or magnesium-lignosulfonate (ALS, CLS, and MLS, respectively) and complex carbohydrate-based compositions containing organic and inorganic ingredients such as molasses. Suitable protein binders illustratively include soy extract, zein, protamine, collagen, and casein. Binders operative herein also include synthetic organic polymers capable of promoting or producing cohesion of methylene urea oligomer fines and these illustratively include ethylene oxide polymers, polyacrylates, polyvinyl pyrrolidone, polyethylene glycol, polyvinyl alcohol, polyvinyl methyl ether, polyvinyl acrylates, polylactic acid, and latex. It is appreciated that calcium and/or magnesium lignosulfonate and other binders containing soluble calcium and/or magnesium ion serve a dual function of binding constituent granules into an inventive pellet while also increasing the amount of soluble calcium and/or magnesium operative to interact with surrounding soil after pellet dispersion.

The pellets of the present invention are optionally associated with an active ingredient. Illustrative examples of active ingredients include fertilizers, soil nutrients, amendment materials, biological factors and biostimulants. A solid, liquid or powder active ingredient is recognized to be operative herein. It will be recognized by those skilled in the art that more than one active ingredient may be incorporated into the particle and that the choice of active ingredient or combination of active ingredients will depend on the intended purpose of the particle and the chemical compatibility of the ingredients and other pellets components. The active ingredient is present in an amount ranging from 0.05% to 95% by weight of the total dry weight of the pellet. In certain embodiments, the active ingredient is present in an amount ranging from 0.1% to 30% by weight of the total dry weight of the pellet.

Fertilizers are substances containing one of the plant nutrients nitrogen, phosphate or potassium and illustratively include urea, sulfur-coated urea, isobutylidene diurea, ammonium nitrate, ammonium sulfate, ammonium phosphate, triple super phosphate, phosphoric acid, potassium sulphate, potassium nitrate, potassium metaphosphate, potassium chloride, dipotassium carbonate, potassium oxide and a combination of these. These and other fertilizers as active ingredients delivered by the inventive pellets are readily intermixed to achieve a variety of levels of nitrogen-phosphorus-potassium, as commonly referred to as an N-P-K rating for the fertilizer. Typical values for the N-P-K are from (0-46)-(0-48)-(0-60) for the inventive pellets, exclusive of the calcium or magnesium soluble ion source and binders that are present.

It is appreciated that a soluble magnesium source when present in an inventive with an ammounium ion source and a phosphorus containing ion source react in-situ in the soil to form ammonium magnesium phosphate salts with low water solubility as a precipitate such as the hexahydrate, commonly known as struvite. Phosphorus containing ion sources commonly found in soil are phosphates, phosphites, and hypophosphates. In some embodiments, an inventive pellet contains the soluble magnesium ion source, as well as at least one of the ammounium ion source and a phosphorus ion source, while still other embodiments, the inventive pellet reacts with an ammounium ion source, a phosphorus ion source, or a combination of other sources such conventional fertilizer applied to the soil, already in the soil, or subsequently applied thereto.

Soil nutrients illustratively include calcium, magnesium, sulfur, iron, manganese, copper, zinc; oxides thereof, salts thereof and combinations thereof with the proviso that such soil nutrients of calcium or magnesium do not have the property of being soluble ion sources as detailed above. Amendment materials are natural organic products such as humic acid, blood meal, bone meal, seed meal, feather meal and soy meal; meat meal; animal waste from various animal sources; activated sludge, hydrolyzed animal hair; fish byproducts; chitin; composts; and a combination thereof. Biological factors are those factors that have a deleterious effect on a biological organism and illustratively include algicides, bacteriocides, defoliants, desiccants, fungicides, herbicides, insecticides, insect growth regulators, miticides, nematicides, ovicides, pesticides, pheromones, repellents, rodenticides and a combination thereof. Biostimulants are substances that promote plant survival and health and illustratively include plant growth hormones and plant growth regulators such as cytokinins, auxins, gibberellins, ethylene, absisic acid and a combination of these.

Representative herbicide active ingredients illustratively include dintroanilines such as benefin, trifluralin, pendimethalin, and prodiamine, oxadiazoles such as oxadiazon, triazines such as atrazine and simazine, triazolinones such as carfentrazone and sulfentrazone, aryloxyphenoxy propionates, arylaminopropionic acid, Cineole (such as cinmethylin), cyclohexanediones, sulfonylureas such as trifloxysulfuron and metsulfuron-methyl, imidazolinones, pyrimidinylthio-benzoate, triazolopyrimidine, pyridazine, phenoxys (or phenoxies), benzoic acids, carboxylic acids (such as DCPA, clopyralid, trichloroacetic acid, and flouroxypyr), quinoline carboxylic acid, semicarbazone, triazinones, uracils, pyridazinone, phenyl-carbamates, nitriles, benzothiadiazoles, organoarsenicals, phenyl-pyridazine, triketones such as mesotrione, Ureas and substituted ureas (such as diuron, linuron, siduron, tebuthiuron, dymron etc.), Amide (such as propanil and bromobutide), thiocarbamates, pyrazolium (such as difenzoquat), phosphoric acid compounds (such as glufosinate-ammonium and glyphosate), triazole, pyridazinone, nicotinanilide, pyridinone (such as fluridone), isoxazolidinone, diphenylethers, n-phenylphthalimides, oxadiazole, triazolinone, chloroacetamides, oxyacetamides, phthalamate, phthalamate semicarbazone, nitrile, n-phenylphthalimides, oxadiazole, triazolinone, acetamides, benzoylisoxazole, isoxazole, pyrazole, pyrazolium, triketone, and benzofuran, various ALS inhibitors, and plant extract herbicides such as the allelopathic exudates of various plants.

Representative microbicidal and fungicidal active ingredients illustratively include plant and general disease control agents including fungicides, fungistats, antibiotics and bacteriocides of the following chemical families and functional groupings; various acetamides, sterol Inhibitors or demethylase inhibitors, dicarboximides (such as iprodione), phthalides, phthalmic acids, triadiazoles, isophthalates, triazines, triconazoles, strobilurins, benzimidazoles, benzithiazoles, dithiocarbamates, carboxamides, carboxides or anilides, chlorphenyls, indolecarboxylic acids, isoxazoles, imidazoles, oxazolinediones, guanidines, diguanidines, piperidines, pyridines, sulfenamides, sulfonamides, quinolines, cyanoimidazoles, pyrazoles, pyrrolecarbonitriles, spiroketalamines, thiazoles, various chemical families of Oomycete (pythium) fungicides, nitriles, chlorinated hydrocarbons, phenylpyrroles, polyoxins, pyridazinones, mycotoxins (e.g. penicillin) or other antibiotics (e.g. streptomycin, Kasugamycin, Blasticidin, Polyoxins, Validamycin, Mildiomycin, and oxytetracyline), morpholines, other organic compounds such as piperalin, piperazine derivatives and tolylfluanid, bronopol, organic compound mixtures (e.g. Bacticin and Harpin protein), organic acids such as cinnamic acid and its derivatives, bacteria such as *Agrobacterium radiobacter, Bacillus subtilus, Erwinia carotovora, Pseudomonas flourescens* and *P. chlorophis*, and any varieties or strains thereof, fungi such as *Candida oleophila, Fusarium, Tricoderma, Gliocladium, Streptomyces*, and *Ampelomyces* and any species, varieties or strains thereof, and viruses such as Tomovax.

For purposes of this invention, other protectants and beneficial ingredients to an inventive pellets include attractants, baits, herbicide safeners, antidessicants, antitranspirants, frost prevention aids, inoculants, dyes, brighteners, markers, synergists, pigments. UV protectants, antioxidants, leaf polish, pigmentation stimulants and inhibitors, surfactants, moisture retention aids, humic acids and humates, lignins and lignates, molluscicides (e.g., slugs and snails), nematicides, insecticides, acaricides, defoliants, and desiccants.

For purposes of this invention, insecticides and acaricides include fast- and slow-acting neurotoxins, insect growth regulators, crop oil, feeding suppressants and repellants, acetylcholinesterase inhibitors, gamma-aminobutyric acid (GABA)-gated chloride channel antagonists, GABA-gated chloride channel antagonists, sodium channel modulators, acetylcholine receptor agonists/antagonists, acetylcholine receptor modulators, chloride channel activators, juvenile hormone mimics, feeding disruptors, mite growth inhibitors, ovicides, reproductive inhibitors, reproductive sterilants, microbial disruptors of insect mid-gut membranes, inhibitors of oxidative phosphorylation at the site of dinitrophenol uncoupling that disrupt adenosine triphosphate (ATP) formation, uncouplers of oxidative phosphorylation (disrupt H proton gradient formation), inhibitors of magnesium-stimulated ATPase, Ecdysone agonist/disruptors (disrupts insect molting by antagonizing the insect hormone ecdysone), octopaminergic agonists, Site I and Site II electron transport inhibitors, inhibitors of chitin biosynthesis type 1—Homopteran, inhibitors of chitin biosynthesis type 2-Dipteran, desiccants, fumigants, carbamates, organophosphates, chlorinated cyclodienes, polychlorocycloalkanes, phenylpyrazoles, diphenylethanes, synthetic pyrethroids, pyrethrins, chloronicotines, (nitroguanidines), nicotine, Cartap, Bensultap, Spinosyns, Avermectin, Milbemycin, juvenile hormone analogues, *Bacillus thurigensis* microbials (biological insecticide/larvicide), organotin matricides, pyrrole compound, sulfite ester matricides, substituted benzoylurea, thiadiazine, triazine, benzoic acid hydrazide, botanicals (neem oil or azadirachtin, rotenone), triazapentadiene, pyridazinone, and fatty acid soaps.

An active ingredient is readily formulated within, or on the surface, of a single inventive pellet or both within the pellet and decorating the surface thereof. An active ingredient is readily incorporated into an inventive pellet regardless of whether in the form of granules, powders, or a liquid. It is appreciated that an active ingredient is readily compounded with inner fillers, dust control aids, flow aids, solvents, surfactants that are used alone or in combination with other active ingredients as part of an inventive pellet. Formation of an inventive pellet readily occurs through pan agglomeration of granular calcium and/or magnesium ion source with a binder and an active ingredient intermixed with a granular soluble calcium and/or magnesium ion source and binder regardless of whether the active ingredient is present in the form of granules, a powder, or a liquid. In embodiments where the soluble calcium and/or magnesium ion source is crystallized as a pellet from a liquid solution, preferably an active ingredient that is not water soluble is coated onto the pellet surface with resort to a coating containing the active ingredient or a granular or powdered active ingredient is adhered to the pellet surface with resort to an underlying adhesive coating on the pellet surface. Such adhesive coatings are readily formed on a pellet surface using one of the aforementioned binders that is sprayed or otherwise coated onto the pellet surface.

Referring now to FIG. 1, an inventive pellet is shown generally at 10. The pellet 10 has a core 12 containing soluble calcium and/or magnesium ion source granules 14 adhered by binder 16. Optionally, active ingredient 18 as present in the core 12 as granules or a solute in binder 16, or a combination thereof. The core has a domain size and a surface defined by radius r; although it is appreciated that oblong pellets are also envisioned with the scope of the present invention. A surface coating 20 is optionally provided on the core surface. The coating 20 having a thickness t and shown in partial cutaway. In certain embodiments, the linear ratio r:t is between 0.6-100:1. Optionally, the active ingredient of the core 18 or a different active ingredient is present in the coating 20 as a solute or granulate as shown generally at 18. Optionally, an adhesive coating 22 overlies the coating 20 with a thickness d. In some embodiments, the linear ratio r:d is between 0.1-10:1.

Figure 2:
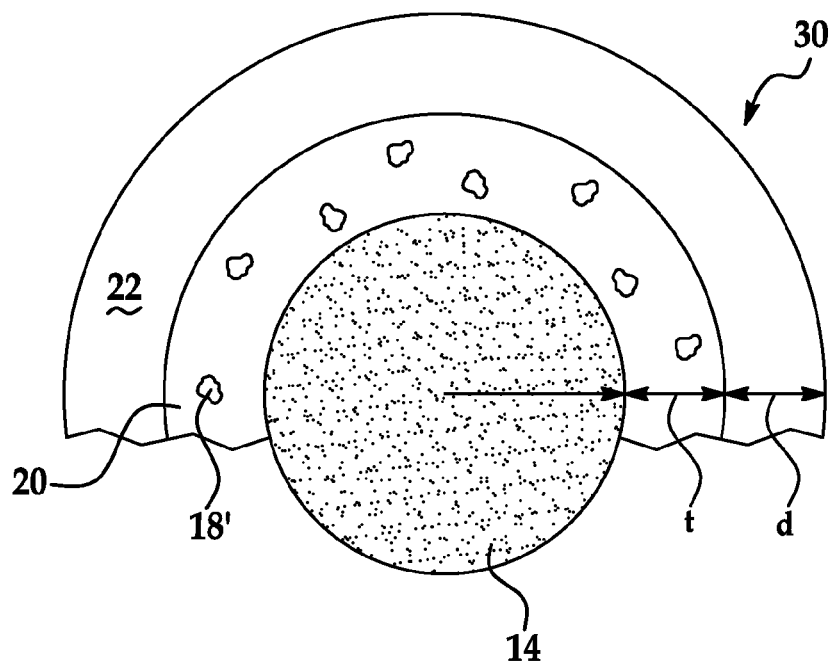
FIG. 2 is a cross sectional view of an inventive pellet in composite with a polycrystalline calcium and/or magnesium ion source granule core, radius r' and an active ingredient depicted in the core, and a surface coating, an optional adhesive layer is also depicted.

Referring now to FIG. 2 in which like numerals have the meaning ascribed thereto in FIG. 1, an inventive pellet is shown generally at 30, characterized by a polycrystalline core of calcium and/or magnesium ion source material 14 having a domain size defined by radius r.

Optionally, a soil adherent pellet according to the present invention and any overcoatings thereon is further overlayered with a water activated adhesive layer. Such a layer is detailed in U.S. Patent Application Publication 2007/0280981. In usage, inventive pellets are broadcast onto a target soil where the pellets reside unchanged until being soaked either through rain exposure or irrigation. An inventive pellet is noted to soften upon wetting and flatten into the soil. It is appreciated that inventive pellets are most effective at reducing runoff in clay containing soils including sodic clay containing soils. Typically, within two hours of wetting and in some cases in less than one hour and as little as one minute of wetting based on the nature of the soil and grain characteristics.

The present invention is further detailed with respect to the following non-limiting examples. These examples are not intended to limit the scope of the pending claims.

EXAMPLE 1

Using a pan agglomeration disc, a binder of calcium lignosulfonate in an amount of 300 grams is applied to a mixture of ground gypsum granules having a size of less than 250 microns. To the 1,300 grams of ground gypsum is added 400 grams of ammonium phosphate. The agglomeration disc is operated and adjusted to generate the desired particle distribution of pellets before the pellets are conveyed to a fluid bed dryer. The pellets are dried at a temperature of 45° C. to a moisture content of less than 0.5%. The pellets are then separated into various size categories using conventional gyroscopic screeners. The pellets had an average diameter of 1 mm with 90% by weight of the pellets being in the size range of between 0.3 mm and 3 mm.

COMPARATIVE EXAMPLE

The process of example 1 is repeated with like sized dolomite in place of the gypsum.

EXAMPLE 2

Runoff boxes were constructed with dimensions of 1 meter in length and width of half a meter and oriented downward at a slope of 5°. The boxes are filled to a depth of 8 cm with high clay soil in which clay amounts to just over 50% of the weight of the soil. A runoff collection system is installed at the down slope edge of each plot to divert runoff to a collection point with the soil extending through several wetting and drying cycles to establish soil structure and reduce preferential flow problems in advance of the trial. An overhead watering system simulated a heavy rainfall event and is used to generate runoff A runoff study is formed with the box plots being presoaked 24 hours prior to trial. Each of the boxes is to each box of pellets were added to each box plot with each trial replicated four times. Inventive pellets of example 1 applied to box plots while like amounts of comparative example material are applied to similar box plots. After dispersal of the pellets a rain event was simulated with 7.5 linear cm of water per hour being applied for a total of 30 minutes. All runoff is collected for 30 minutes after runoff beginning to commence. The total runoff being mixed and a 200 ml subsample collected for phosphate analysis. The runoff subsamples are filtered through a 0.45 micron filter and analyzed for dissolved phosphate by high pressure liquid chromatography. Consistency of water runoff across all boxes is noted as approximately 20 liters. The mean dissolved phosphate runoff concentration for comparative example treatments averaged 27% of phosphate introduced from comparative example pellets. In contrast to the comparative example, the inventive pellets of example 1 had an average phosphate recovery in runoff water of 9% of the phosphate introduced through the inventive pellets.

EXAMPLES 3-8

Examples 3-8 are formed with the compositions as provided in the table below.

|  | Example | | | | | |
|---|---|---|---|---|---|---|
|  | 3 | 4 | 5 | 6 | 7 | 8 |
| Calcium Source | Gypsum fines 250 micron | — | — | $CaCl_2$ | $CaCl_2$ | — |

-continued

| | Example | | | | | |
|---|---|---|---|---|---|---|
| | 3 | 4 | 5 | 6 | 7 | 8 |
| % Calcium Source | 90 | 40 | 65 | 80 | — | — |
| Binder | CLS | CLS | — | — | — | — |
| % Binder | 9 | 20 | 15 | — | — | — |
| Active Ingredient (AI) | Trifluralin | 10-20-10 N—P—K | diazinon | 10-20-10 N—P—K | — | — |
| % AI | 1 | 40 | 20 | 20 | — | — |
| AI location | Pellet core | Pellet core | Pellet core | Pellet surface | — | — |
| Surface Coating | — | — | — | CLS | carboxy-methycellulose | — |
| Thickness of surface coating | — | — | — | 30% of pellet diameter | — | — |

Inventive pellets of examples 6-8 are formed from commercially available calcium chloride pellets having a mean diameter of 1 mm with the calcium chloride pellets being overlaid with conventional N-P-K fertilizer granules having a mean size of 50 microns adhered to the calcium chloride pellet surface with resort to a pellet surface coating of calcium lignosulfonate (CLS) or carboxymethycellolose (CMC) in examples 6 and 7, respectively. The inventive pellet of example 8 lacks an active ingredient and instead has CMC operating as contact adhesive upon wetting to facilitate adhesion to the soil. For the purposes of the weight percentages provided in examples 4-8 are not inclusive of the amount of non-active ingredient surface coatings. Inventive pellets of examples 3-7 all demonstrated reduced runoff of active ingredient relative to comparable pellets to each of the examples with calcium ion source being non-soluble dolomite fines.

The invention claimed is:

1. Soil adherent pellets to be applied to soil comprising:
   gypsum or calcium chloride present in an amount of 15% to 99.9% by weight of the total dry weight of each of the pellets, said gypsum or calcium chloride producing soluble calcium ions in the soil;
   a phosphate containing fertilizer in each of the pellets; and
   a binder present in an amount from 85% to 0.1% by weight of the total dry weight of each of the pellets, each of the pellets having a surface and a pellet mean domain size of from 0.1 to 30 mm, each of the pellets having a moisture content of less than 0.5% by weight, wherein runoff of phosphate from said phosphate containing fertilizer is reduced compared with a delivery pellet based on non-soluble dolomite fines.

2. The pellets of claim 1 wherein said phosphate containing fertilizer is present from 0.05 to 95 total dry weight percent of the each of the pellets.

3. The pellets of claim 1 wherein gypsum is present.

4. The pellets of claim 1 wherein calcium chloride is present.

5. The pellets of claim 1 further comprising a surface coating on the pellet surface.

6. A process for reducing runoff of phosphate from soil comprising:
   applying the pellets of claim 1 to a soil; and
   wetting the soil to induce said phosphate penetration into the soil to inhibit runoff of said phosphate.

7. The process of claim 6 further comprising adding a magnesium ion source into each of the pellets and further comprising reacting said magnesium ion source in the soil with an ammonium ion source and said phosphate to form a precipitate of struvite in the soil.

8. The process of claim 6 further comprising reacting said gypsum or calcium chloride with clay in the soil to flocculate the clay and form a pore in the clay around each of the pellets.

9. A process for reducing increasing porosity in a clay-containing soil comprising:
   applying the pellets of claim 1 to the clay containing soil; and
   wetting the clay-containing soil to induce said gypsum or said calcium chloride to react with clay in the soil to flocculate the clay and form a pore in the clay around the pellets to increase porosity in the clay-containing soil.

* * * * *